United States Patent [19]

Marceau et al.

[11] Patent Number: 5,491,326
[45] Date of Patent: Feb. 13, 1996

[54] CARD METERING SYSTEM

[75] Inventors: Justin Marceau, Safety Harbor; Darrell G. Rademacher, New Port Richey, both of Fla.

[73] Assignee: XCP, Inc., Dryden, N.Y.

[21] Appl. No.: 344,383

[22] Filed: Nov. 23, 1994

[51] Int. Cl.$^6$ ........................................ G06F 7/08
[52] U.S. Cl. ............................ 235/381; 235/375
[58] Field of Search ...................... 235/375, 381

[56] References Cited

U.S. PATENT DOCUMENTS

| | | |
|---|---|---|
| 3,513,298 | 5/1970 | Riddle et al. . |
| 3,629,834 | 12/1971 | Randall . |
| 4,013,894 | 3/1977 | Foote et al. . |
| 4,024,379 | 5/1977 | Pfost et al. . |
| 4,328,414 | 5/1982 | Atalla . |
| 4,357,529 | 11/1982 | Atalla . |
| 4,513,199 | 4/1985 | Sidline . |
| 4,626,669 | 12/1986 | Davis et al. . |
| 4,639,584 | 1/1987 | Adams et al. . |
| 4,752,676 | 6/1988 | Leonard et al. . |
| 4,758,714 | 7/1988 | Carlson et al. . |
| 4,900,904 | 2/1990 | Wright ................................. 235/381 |
| 4,908,499 | 3/1990 | Guion . |

*Primary Examiner*—Harold Pitts
*Attorney, Agent, or Firm*—Bernhard P. Molldrem, Jr.

[57] ABSTRACT

Meter cards, which are structurally identical with magnetic stripe vend cards, are used to collect and transfer transaction data from card actuated vending machines to a transaction terminal. The transaction terminal contains a card reader and a computer device. Transaction data, including the number of units sold, i.e., vends or plays, on the vending machines as well as the dollar volume of sales is fed into the transaction terminal and the associated computer device carries out inventory and accounting functions. The meter card contains command indicia that instruct the vend machine card reader to write the transaction data onto the magnetic stripe of the meter card. The transaction data can also include incentive or redemption points awarded to card holders for using the vend cards. A separate meter card is used for each vending machine in the system to transfer its transaction data to the transaction terminal.

5 Claims, 2 Drawing Sheets

CARD METERING SYSTEM

BACKGROUND OF THE INVENTION

The present invention is directed to vending machines which dispense products, i.e., either goods or services, automatically in exchange for value or credit as represented by indicia on a coded vend card. The invention is more specifically directed towards a technique for accounting for the number of plays or transactions, the cash sales volume, and other data relating to the transactions carried out on the associated vending machines of a system.

Many varieties of automatic vending machine devices are in common, everyday use. These include not only machines that vend snack food items, soft drinks, or other food items, but also machines that vend services, such as photocopiers, pay telephones, laundry machines and (where legal) amusement or gaming machines. Vending machines have traditionally accepted tokens, cash (bills and coins) or, more recently, magnetic stripe cards. In the latter case, a vend card has an encoded magnetic stripe. Coded indicia recorded on the magnetic stripe represent the purchase limit available to a card holder. To make a purchase, the card holder inserts the magnetic stripe vend card into a card reader, and the reader picks up and interprets the indicia on the card. This enables the associated vending machine to dispense its goods or services. When the purchase is complete, the remaining, unused purchase credit is written back onto the magnetic stripe, and the card is returned to the card holder.

Magnetic stripe vend cards have several advantages over other techniques. With the card rather than cash being used for purchases, losses due to pilferage and due to counterfeit coins, tokens and currency are markedly reduced. Card vend systems can also enable the automatic machines to reward or otherwise to incentivize the purchaser to make card purchases rather than cash purchases.

A conventional set-up can match a vend card reader with each of the vending machines, so each machine would require its own card reader. In more complex systems, a group of vending machines can all be associated with a single card reader to serve all the machines. Vending machine arrangements that permit either cash or vend-card purchases are described in U.S. Pat. No. 4,669,596. Several improved vending machines have been previously proposed to permit the purchaser to make purchases using a credit or debit card. Typical vending systems are described in Goodman U.S. Pat. Nos. 5,091,713; Horne et al. 5,091,713; Bissell et al. 4,124,109; Tateisi 4,011,433; Tanaka et al. 3,935,933, and Hayeshi 4,809,837. A system in which several vending machines are all associated with a single card reader is described in my co-pending U.S. patent application Ser. No. 08/236,032, filed May 2, 1994, the contents of which are incorporated herein by reference.

As card vending systems have become more popular, card vending has become employed for a larger variety of goods and services. With the increased volume and variety of vend card use, the problem of accounting and inventory for all of the vending machines has come to the forefront. Obtaining a meter reading for a pre-paid debit card system typically requires an operator to read meters on the various machines and to write down the meter readings in a book for each vending machine. Reading the number of transactions or the cash or money value of the transactions on a given machine can require setting switches or push buttons on the machine to obtain a reading, or printing to a printer to obtain a printed paper output of the transaction record of the machine. It is also possible to read meters remotely by transmitting the meter reading on a telephone line to a central station. However, access by telephone lines can lead to security problems, and to an inability to transfer transaction data in the case of a communications link failure. These techniques are also open to human error, and moreover require a large number of steps in collecting and processing the data.

Several systems have been proposed for transfer of information from remote terminals to a central "host" terminal where data from the remote terminals are processed. In McCarthy U.S. Pat. No. 5,276,312, a "smart card" which includes a small computer chip is used to communicate between a central terminal and so-called "agent" remote terminals. The agent terminals can be automated vending apparatus. The smart card conveys wagering limit information, for example, and can be used to upload or download data at the agent terminals.

Mansvelt et al. U.S. Pat. No. 5,175,416 describes a funds transfer system for exchanging value information between two smart cards. Johnson et al U.S. Pat. No. 5,149,945 relates to a device that couples to a personal computer or point-of-sale device, and communicates with a portable data carrier, such as a smart card. Wright et al. U.S. Pat. No. 4,900,903 describes an automated transaction system that also employs microprocessor-bearing user cards. Bergeron et al. U.S. Pat. No. 4,882,473 describes an on-line smart-card actuated wagering system, where information that is stored on the cards can include transaction data and maintenance data. Haun et at. U.S. Pat. No. 4,843,200 describes a point-of-sale (POS) credit authorization slip which incorporates two magnetic strips. The second magnetic strip permits transfer of data from the POS terminal to the credit card issuer. Richardson et al. U.S. Pat. No. 4,747,049 relates to another point-of-sale device that accepts customer cards, and periodically transfers purchase information from its write buffer onto magnetic tape.

To date, no one has disclosed a convenient way for meter reading the purchase transaction data on various vend card actuated vending machines in a vending system. No system has been disclosed that avoids installing additional hardware above what is already provided for the system. No system has been proposed that would employ as a medium for reading and transferring the transaction data meter cards that are structurally identical to the vend cards.

OBJECTS AND SUMMARY OF THE INVENTION

It is an object of this invention to provide a card vending system in which transaction data can be easily transferred from the vending machines to a central processing or accounting computer, and which avoids the drawbacks of the prior art.

It is another object of the invention to provide a card vending system in which magnetic stripe meter cards transfer the transaction information from the vending machines to a transaction accounting station.

According to an aspect of the invention, a vending system comprises a plurality of vending machines each of which includes a product dispensing mechanism and a card reader mechanism. A purchaser inserts a vend card into the card reader mechanism to effect a purchase transaction. The card contains readable indicia, for example, magnetically coded data contained on a magnetic stripe on the card. The card reader includes means to read the indicia on the card, means to actuate the product dispensing mechanism, means to interpret the indicia read from the card to ascertain the purchase credit balance available to the purchaser in possession of the vend card, and means to write onto the vend card a new purchase credit balance available to the purchaser. The card reader stores transaction data for the associated vending machine, including the number of purchase transactions (or "plays") and the dollar value or other money value of the transactions that have occurred on the vending machine.

A plurality of meter cards are associated with the vending machines. Each meter card is structurally identical with the vend cards, but has different indicia, i.e., different coding, recorded on the magnetic stripe. The meter card is inserted into the card reader mechanism of the associated vending machine. The meter card contains pre-recorded indicia that includes command codes to command the card reader to access the transaction data stored in said card reader mechanism. The card reader then records the transaction data onto the magnetic stripe of the meter card.

The system has a transaction terminal at which a computer station receives, stores, processes, and displays the purchase transaction data for all of the vending machines in the system. The transaction terminal has a card reader mechanism coupled to the computer station. Each of the meter cards is inserted in turn into the transaction terminal card reader mechanism for transferring the transaction data from the meter card to the computer station. The transaction data that the vending machines record on the respective meter cards can preferably include a vend machine identification code as well as the purchase transaction data for the vending machine associated with said meter card.

Preferably, the magnetic stripe on the vend card has a region in which is recorded the purchase credit balance and an additional region in which is recorded a redemption point balance. The latter represents redeemable credit awarded to the purchaser for using the vend card in the card vending system. In this case the magnetic stripes of the meter cards also include a first region in which the dollar purchase value information is recorded and a second region in which is recorded a code that represents the redemption point balance awarded by the respective vending machine. The magnetic stripes on the meter cards can include a region on which are recorded data representing the identity of the associated vending machine, and the date and time at which the transaction data for the associated vending machine were recorded.

The card vending system can include a card dispensing machine and a station at which credit value can be purchased and added to the purchase credit balance of the vend card. The associated card reader records the increased credit balance as said new purchase credit balance available to said purchaser. In this case, the transaction data recorded on the meter card can include the number of new cards sold, the number of credit purchase transactions, and the total dollar value of such transactions.

An invention and accounting of the card vending machines in the system simply involves inserting a meter card into the card reader of each of the vending machines, and collecting it when it is discharged from the card reader. The meter cards are then inserted, one after the other, into the card reader at the transaction terminal. There, the associated computer station automatically reads and processes the transaction data, and provides an accounting of the plays or transactions, the dollar value of the purchases, the dollar value of the credit purchased by card holders, and the amount of redemption points awarded. Other information and various statistics can be provided as well.

The vend cards can be one-use cards or many-use cards. Preferably, the meter cards are configured for one-use operation. That is, the virgin meter card can contain a predetermined code that the card reader converts to another code to preclude the use of the meter card a second time. For example a "0" is changed to a "1", which instructs the vending machines not to write over the stripe, and to immediately eject the card. This code cannot be erased in a card reader. However, if it is desired to reuse the meter cards, the cards can be specially treated and re-coded.

In one preferred mode, the meter cards are paper cards, and a location is provided for the user to write the date, time, and machine number. The magnetic stripe meter cards are archivable, and can be stored indefinitely for later reference.

The above and many other objects, features, and advantages of this invention will become apparent from the ensuing description of a preferred embodiment, which is to be read in connection with the accompanying Drawing.

DETAILED DESCRIPTION OF A PREFERRED EMBODIMENT

Figure 1:
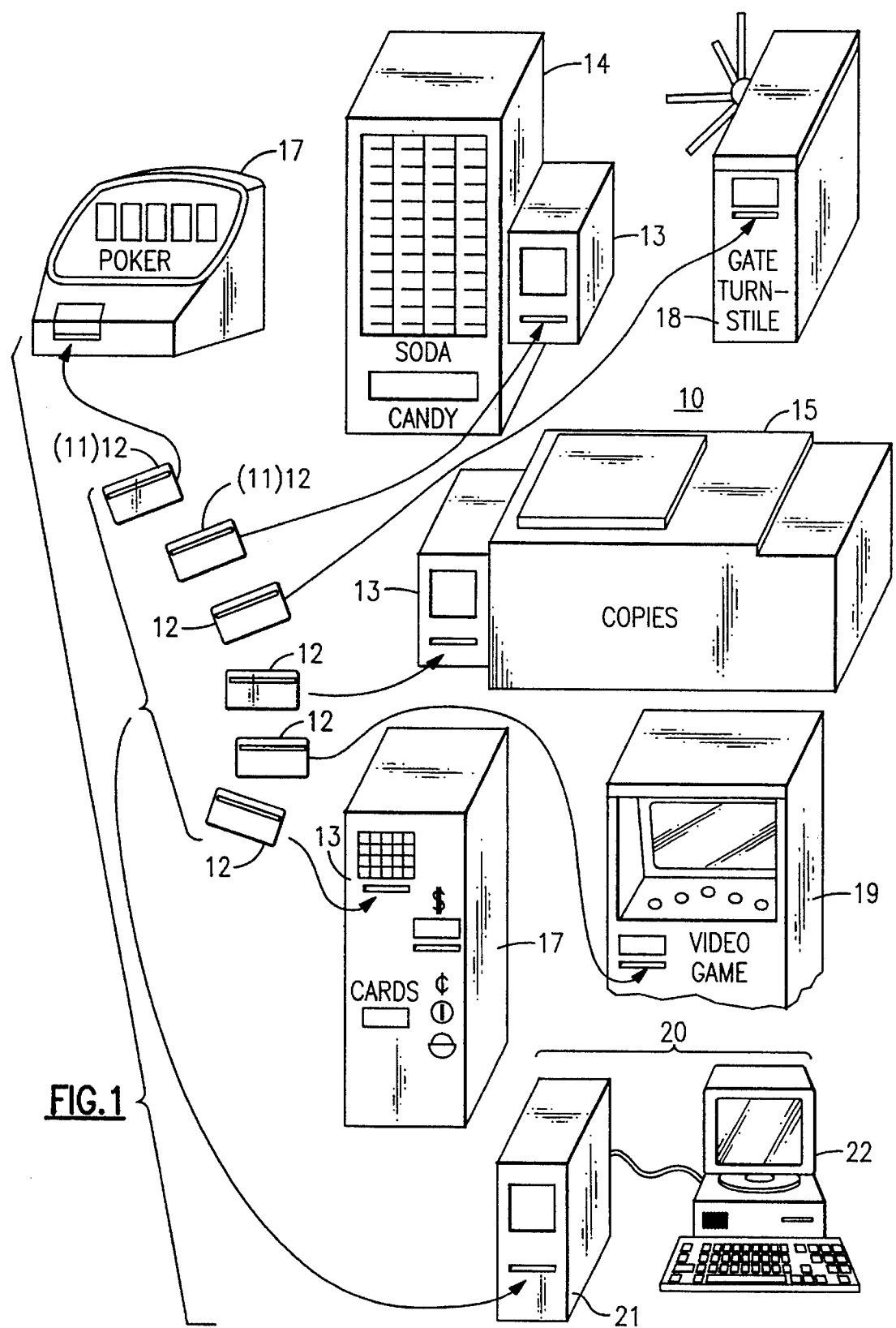
FIG. 1 is a schematic system diagram showing various vend card operated vending machines and a transaction terminal, according to one embodiment of this invention.
Figure 3:
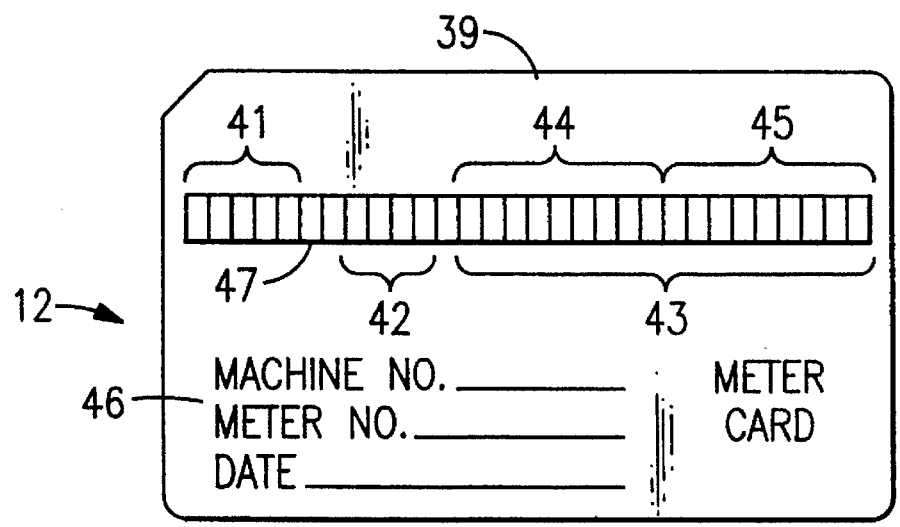
FIG. 3 is a plan view of a meter card as employed in this embodiment.

With reference to the Drawing, and initially to FIG. 1, a card-actuated vending system includes a number of vending machines for dispensing to card holders a variety of goods and/or services. For a given system, associated vend cards have a common access code, so that card holders can make purchases from any of the machines of the system, but vend cards from other systems are denied access to make purchases. In this system, card holders are issued magnetic stripe vend cards 11, which can be employed throughout the system 10. Meter cards 12, which are structurally identical to the vend cards 11, are employed by the system operator for accounting purposes to obtain transaction data from the various vending machines in the system.

The system vending machines each have an associated card reader 13. A card holder wishing to make a purchase simply inserts the vend card 11 into a card slot in the card reader, and the card reader picks up the magnetically stored indicia. These indicia include an access code that authorizes the card holder to make purchases on the vending machine, and an available purchase balance code which contains the money value of the card 11, i.e., the maximum value of purchases that the card holder is authorized to make. When a purchase transaction is complete, the card reader 13 computes a new purchase credit balance, writes the new balance onto the card 11, and ejects the card. This concept is described in various patents, and one such card reader is described in my earlier U.S. Pat. No. 4,879,607, granted Nov. 7, 1989.

Here, the system includes several typical examples of available card operated vending machines, including a snack vending machine 14, which can dispense candy, soft drinks, hot sandwiches, or other food items. A copy machine 15 can be located in a library or records center, and adapted for card-operated copying of documents. An amusement device 16 is here shown as a video poker machine, but could instead be an electronic pinball machine or other gaming or entertainment device. A card dispensing machine 17, here shown with an internal card reader, permits a customer to purchase a vend card 11, and also permits the customer to add to the purchase credit balance of a vend card already in his or her possession. The latter operation is carried out be inserting the card 11 into the card slot, and then inserting currency and/or coins to build up the card balance to the desired level. The machine 17 ejects the card 11 with an increased balance. The system can also include a card actuated turnstile 18, e.g., for admission to a transportation system or entertainment event; and a video game 19.

Also shown in FIG. 1 is a transaction accounting terminal 20, at which a card reader 21 is coupled to a computer terminal or station 22. The computer terminal is suitably programmed to receive and process transaction data from the various vending machines 14–19 in the system 10. In this case, respective meter cards are inserted into each of the card readers 13 associated with the various vending machines, and then the meter cards 12 are inserted one after the other into the card reader 21 at the transaction terminal. The meter cards 12 are structurally identical to the vend cards 11, but contain special coding to command the vending machines to record transaction data on the meter card. The data recorded on the meter card for each vending machine includes the number of plays or purchases, the money value of the purchases, and the time and date that the meter reading was taken on the card 12. The data for the several meter cards 12 are compiled in the computer terminal, and an accounting of the transactions throughout the system 10 is automatically produced. The computer terminal 22 can also provide statistics based on these meter data, e.g., frequency and volume of purchases or plays, e.g., by time of day or by day of week.

Vending machines can provide the option of card or cash purchases, and can be equipped to provide an incentive to card holders for vend card use. That is, the machines can implement a small price differential in favor of card purchases. For example, the copy machine 15 can dispense copies at fifteen cents per copy for cash purchases, and twelve cents per copy for card purchases.

It is also possible for the system 10 to employ redemption points as an incentive for the use of vend cards 11. These redemption points are awarded to the purchaser for his or her use of the card, and the points awarded can be recorded on the vend card 11 in an area separate from the card holder's remaining purchase credit balance. Redemption points can then be redeemed, e.g., to purchase additional merchandise or services, or to gain more playing time in the case of an amusement device. The redemption point concept is described in my earlier U.S. patent application No. 08/236,032.

Where redemption points are employed, the vending machines record redemption point data as well as money purchase data onto the meter cards 12 as part of the transaction data.

Figure 2:
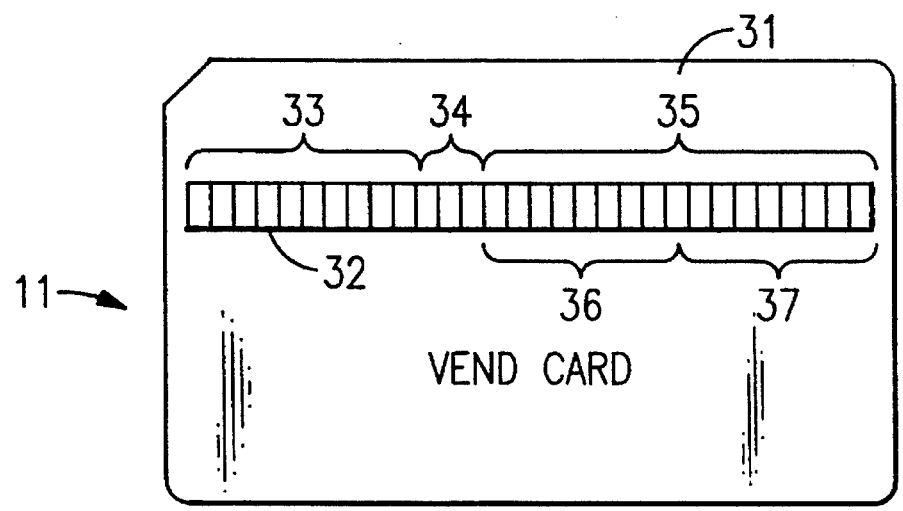
FIG. 2 is a plan view of a vend card as employed in this embodiment.

A vend card 11 according to one embodiment of this invention is shown in detail in FIG. 2. Here the card includes a flat, rectangular plastic substrate 31 of standard size with a magnetic stripe 32 extending therealong. The stripe 32 can be positioned centrally or to one side of the midline of the card. At one end, the stripe has an access code area 33 which contains recorded timing and access codes that permit the cardholder to purchase services or merchandise from the machines of the system 10. The stripe 32 also has a punch mark area 34 where a punch mark code can be recorded, and a credit value area 35 on which is recorded the purchase credit available to the cardholder. Here, the system is configured for both cash value and redemption points, so the area 35 is divided into a cash balance region 36 and a subsequent redemption points award region 37. For purposes of illustration, these regions 36 and 37 are shown as physically separate areas, but the manner in which they are recorded depends on the operation of the card readers 13. The cash value and redemption points are each written twice into the area 35.

A meter card 12 according to this embodiment is physically identical to the magnetic stripe vend card 11, with the principal difference being in the codes recorded thereon. Here, the card 12 consists of a flat, rectangular substrate 39 and a magnetic stripe 40. The magnetic stripe has an access code region 41. This region contains timing, parity, and access codes that instruct the machines of the system and their associated card readers 13 to write transaction data onto the magnetic stripe 40. The time and date, as well as the identity of the particular machine, are recorded by the card reader 13 in a machine I.D. region 42. The transaction data are then recorded on a transaction data region 43. These transaction data include, as aforementioned, the number of transactions on the particular vending machine, the cash value of the purchases made, by card and by currency, and the number of redemption points awarded at that machine. Here, the total number of plays or vend transactions is shown recorded in a region 44 and the number of redemption points is recorded in a region 45. The date and machine number can be written in ink or pencil into a region 46 of the card's paper substrate 39. As with the vend card, a punch code can be entered, e.g. , in region 47, to preclude writing over stored transaction data.

A separate meter card is used for each of the vending machines in the system. The meter cards obtain the transaction data from the vending machines very quickly, and the transaction data are recorded without any operator action other than inserting and removing the meter card. Consequently, operator errors in reading and recording a meter reading or setting, and errors in transferring the transaction data to the computer station 20, are eliminated.

The amount of information included in the transaction data can be as general or as detailed as desired, and tailored for the particular system. For example, the transaction data can isolate product sales by type or brand, if the system operator wants to ascertain the popularity of a particular snack or soft drink.

While the invention has been described in detail in respect to one preferred embodiment, it should be recognized that many modifications and variations will present themselves to those skilled in the art without departing from the scope and spirit of this invention, as defined in the appended claims.

We claim:

1. A card vending system that comprises
 a plurality of vending machines each of which includes a product dispensing mechanism for dispensing to a purchaser in possession of a vend card a product selected by the purchaser; said card containing readable indicia; and a card reader mechanism into which the purchaser inserts said card to effect a purchase transaction, including means to read the indicia on said card, means to actuate said product dispensing mechanism, card controller means to interpret the indicia read from the card to ascertain the purchase credit balance available to the purchaser in possession of the vend card and to write onto the vend card a new purchase credit balance available to said purchaser; said card reader storing transaction data for the associated vending machine, including the number of purchase transactions and money value of the transactions on said vending machine;

a plurality of meter cards each associated with a respective one of said vending machines, each said meter card being insertable into the card reader mechanism of the associated vending machine, and having recorded indicia thereon including command codes to command the card reader to write onto said meter card the transaction data stored in said card reader mechanism; and a transaction terminal which includes computer station means for receiving, storing, processing and displaying the purchase transaction data for the vending machines in the system; and a meter card reader mechanism coupled to said computer station and into which said meter cards are inserted for transferring from the meter card to said computer station a vend machine identification code and the purchase transaction data for the vending machine associated with said meter card.

2. A card vending system according to claim 1, wherein said vend cards and said meter cards have thereon magnetic stripes on which the purchase credit balance and the purchase transaction data are respectively recorded by the card reader mechanism of one of said vending machines.

3. A card vending system according to claim 2, wherein the magnetic stripes on said vend cards have a region in which said purchase credit balance is recorded and an additional region in which is recorded a redemption point balance representing redeemable credit awarded to purchasers for using the vend cards in the card vending system; and the magnetic stripes of said meter cards also include a region in which is recorded a code that represents the redemption point balance awarded by the respective vending machine.

4. A card vending system according to claim 2, wherein the magnetic stripes on said meter cards include a region on which are recorded data representing the identity of the associated vending machine, and the date and time at which the transaction data for the associated vending machine, was recorded thereon.

5. A card vending system according to claim 1 wherein at least one of said vending machines includes means for accepting cash from said purchaser and increasing the purchase credit balance available for said purchaser so that the associated card reader records the increased credit balance as said new purchase credit balance available to said purchaser.

* * * * *